United States Patent [19]

Häseler et al.

[11] 4,094,448
[45] June 13, 1978

[54] DOSING DEVICE FOR PULVERULENT MATERIAL

[75] Inventors: Helmut Häseler; Günter von der Kall, both of Leverkusen, Germany

[73] Assignee: Agfa-Gevaert Aktiengesellschaft, Leverkusen, Germany

[21] Appl. No.: 659,278

[22] Filed: Feb. 19, 1976

[30] Foreign Application Priority Data

Feb. 25, 1975 Germany .............................. 2508066

[51] Int. Cl.² ............................................. G01F 11/00
[52] U.S. Cl. ................................... 222/342; 222/409; 222/410; 222/457
[58] Field of Search ............... 222/457, 342, 409, 333, 222/410, 222, 223, 247, 248, 353, 408; 239/659, 668, 687; 214/17 CB, 33, 35 R; 266/195, 177

[56] References Cited

U.S. PATENT DOCUMENTS

| | | | |
|---|---|---|---|
| 1,480,597 | 1/1924 | Campbell | 222/410 X |
| 2,305,203 | 12/1942 | Smith | 222/410 X |
| 2,626,482 | 1/1953 | Munday et al. | 222/342 X |
| 2,693,964 | 11/1954 | Kalbac | 239/687 |
| 2,982,449 | 5/1961 | Szyman et al. | 222/342 X |

FOREIGN PATENT DOCUMENTS

449,985  9/1927  Germany .............................. 266/27

*Primary Examiner*—Robert B. Reeves
*Assistant Examiner*—John P. Shannon
*Attorney, Agent, or Firm*—Connolly and Hutz

[57] ABSTRACT

The dosing device is installed between a funnel-shaped storage container for the pulverulent material and an open vessel underneath it. It consists of a flat plate arranged between the open vessel and the outlet aperture of the storage container so that a standing column of material is formed between this plate and the outlet aperture, and a dosing rod which is displaceable or rotatable in a horizontal plane. The dosing rod is passed periodically through the column of substance and with each passage conveys an approximately constant quantity of material into the vessel underneath it. This device is also capable of dosing materials which tend to stick together and cake to the apparatus.

6 Claims, 1 Drawing Figure

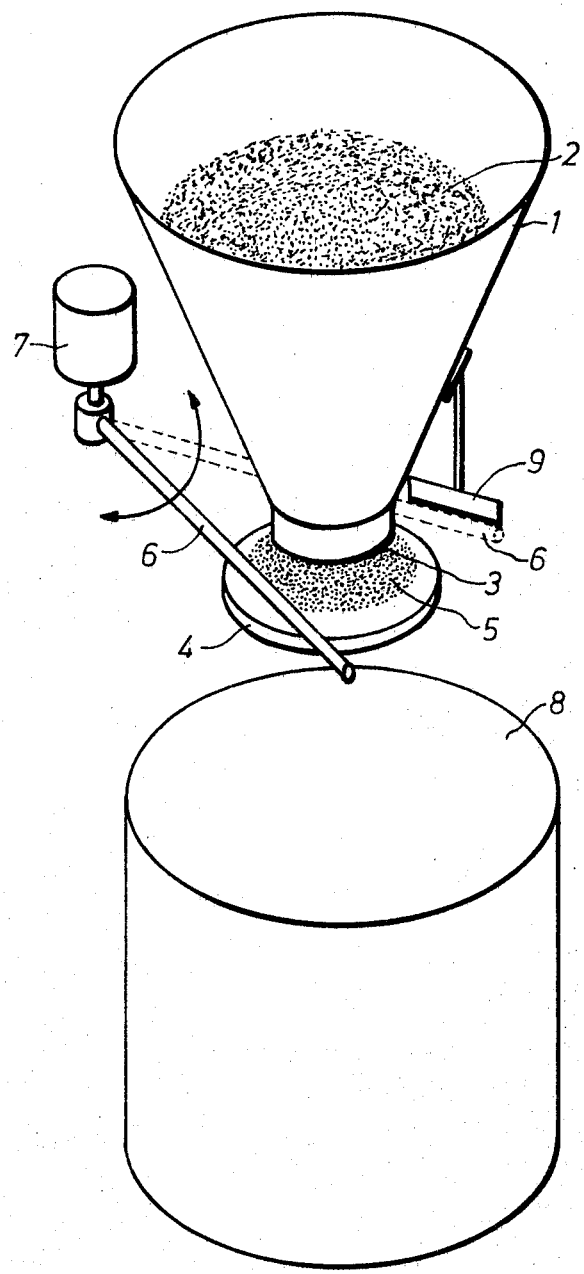

DOSING DEVICE FOR PULVERULENT MATERIAL

This invention relates to a device for dosing a pulverulent material into an open vessel. Continuous dosing of pulverulent materials to a reaction liquid or to other solid substances has long been known in chemical engineering. The apparatus used for this purpose are normally dosing screws or conveyor belt scales. There are numerous materials which when in the pulverulent state tend to lose their free-flowing quality and cake together when subjected to pressure and friction. Such a substance then sticks to the metal or plastic surfaces of the dosing device and dosing becomes very inaccurate. In many cases, pulverulent materials have the added disadvantage of being hygroscopic. These materials absorb water vapor or solvent vapor from the reaction solution during rest periods so that they become less pourable. Dosing devices involving shaker conveyor troughs or conveyor belt scales cannot be used for such materials because the absorption of moisture indirectly affects the dosing process.

It is therefore an object of the present invention to provide a continuously operable dosing device which will operate without troubles and with great accuracy over long periods and give consistently reproducible results even when used for the difficult pulverulent material, mentioned above. The dosing device is designed to dose the pulverulent material into an open vessel underneath it.

According to the invention there is provided a device for dosing a pulverulent material into an open vessel, comprising a funnel-shaped storage container for pulverulent material, the container having an outlet aperture at its lower end, a plate located beneath the said aperture and a distance therefrom to that in use a standing column of material is formed between the plate and the aperture, a dosing rod which is displaceable or rotatable in a horizontal plane which passes through the column of material, and means for periodically passing the rod through the column of material thereby to convey at each such passage a quantity of material into the open vessel which is located beneath the dosing device.

The open vessel is advantageously designed as a continuous flow reaction vessel so that the pulverulent material can be continuously reacted with a solution in the vessel underneath it.

To prevent small residues of substance being left on the dosing rod after its passage through the column of material, a stripper is advantageously arranged above the plane of the dosing rod to carry the residues into the open vessel underneath after each passage of the rod.

The dosing device according to the invention doses with a high degree of accuracy even those pulverulent materials which tend to cake and stick to the device. Moreover, the dosing device is simple in construction and inexpensive to manufacture. One major advantage of the dosing device is that it does not subject the material to high frictional forces or pressure. The substance is therefore reliably prevented from forming lumps. The dosing device according to the invention is also particularly suitable for dosing hygroscopic materials. In contrast to shaker conveyor troughs and conveyor belt scales known in the art, the rate at which it doses is not affected by water absorption by the material. In the case of shaker conveyor troughs, the rate of dosing is to a large extent determined by the flow properties of the substance, which in turn often depends on the amount of water absorbed by it. In the case of conveyor belt scales the quantity of water absorbed directly affects the dosing rate.

The dosing rate can easily be adapted to any given requirements within wide limits by adjusting the frequency of operation of the dosing rod. In addition, the dosing range can be varied by adjusting the height of the column of material above the plate and the diameter of the dosing rod.

One particular application of the device is the dosing of pulverulent sodium dithionite for the continuous desilvering of spent bleach-fixing baths in the photographic industry.

The invention will now be explained in more detail with reference to an example shown in the drawing which is a perspective view of the dosing device according to the invention.

The pulverulent material, for example sodium dithionite, stored in a funnel-shaped container 1 trickles from the container on to a flat plate 4 under the funnel outlet 3, where it collects to form a standing column 5 of material. The surface of the flat plate 4 is generally larger than the cross-section of the outlet aperture 3, that is to say the plate 4 extends outside the limits of the aperture 3 in the horizontal direction. The column 5 is therefore formed by part of the pulverulent material 2 collecting on the plate 4 before it can trickle over the edge of the plate.

A dosing rod 6 which is rotatable in the horizontal plane is arranged at the same level as the column of material 5. The rod 6 is driven by the motor 7. The diameter of the rod 6 is smaller than or at the most equal to the height of the column 5 or the flat plate 4. With each rotation of the rod, it passes once through the column of substance and thereby conveys an approximately constant quantity of substance into the reaction vessel 8 underneath it. The rate of dosing is proportional to the speed of rotation of the dosing rod 6.

To ensure quantitative transfer of the material on the dosing rod 6 into the reaction vessel 8, a stripper 9, for example a rubber strip, is arranged slightly above the dosing rod. Viewed in the direction of rotation of the rod, it is fixed behind the container 1. The pulverulent material 2 normally drops unguided into the reaction vessel 8 below it. After each dosing operation, more material slips down from the container 1 to refill the space between the plate 4 and outlet aperture 3.

If the dosing device is used for a continuous process, the reaction vessel 8 must be a continuous flow vessel.

EXAMPLE OF DIMENSIONS

| | |
|---|---|
| Distance between plate 4 and outlet aperture 3 | : 4 mm |
| Diameter of outlet aperture 2 | :20 mm |
| Diameter of dosing rod | : 2 mm |
| Diameter of plate 4 | :40 mm |

Under these conditions, for example, the quantity of sodium dithionate dosed into the reaction vessel 8 is 1.6 g with each passage of the rod.

The continuous rotation of the dosing rod 6 could be replaced by a reciprocating movement.

The motor 7 would in that case be a reversing motor, for example of the kind used for windscreen wipers. The dosing device could also be designed with a dosing rod 6 executing a translational reciprocating movement through the column 5.

What we claim is:

1. A device for dosing a pulverulent material into an open vessel, comprising a funnel-shaped storage container for pulverulent material, the container having an outlet aperture at its lower end, a plate located beneath the said aperture at a distance therefrom so that in use a standing column of material is formed between the plate and the aperture, a dosing rod which is displaceable in a horizontal plane which passes through the column of material, movable means supporting the dosing rod to move from positions disposed completely outside of the column of material and projected borders of the plate to positions passing through the column of material, means for periodically passing the rod from positions completely outside through the column of material thereby to convey at each such passage a predetermined quantity of material into the open vessel which is located beneath the dosing device, and a stripper is arranged above the plane of the dosing rod at such a position that with each passage of the dosing rod through the column the stripper carries any residues of substance left on the rod into the open vessel by wiping contact with the dosing rod above the open vessel.

2. A device according to claim 1, wherein the open vessel is a continuous flow reaction vessel.

3. A device according to claim 1 wherein the dosing rod is constructed and arranged to be rotatable.

4. A device according to claim 1 wherein the rod has a thickness which is slightly less than the height of the column.

5. A device according to claim 1 wherein the rod has a substantially round cross section.

6. A device according to claim 5 wherein the rod has a thickness which is slightly less than the height of the column.